(12) United States Patent
van der Sijde et al.

(10) Patent No.: US 11,739,910 B2
(45) Date of Patent: Aug. 29, 2023

(54) LED ARRAYS WITH SELF-STABILIZING TORCH FUNCTIONS

(71) Applicant: LUMILEDS LLC, San Jose, CA (US)

(72) Inventors: Arjen van der Sijde, Eindhoven (NL); Nicola Bettina Pfeffer, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 94 days.

(21) Appl. No.: 17/125,861

(22) Filed: Dec. 17, 2020

(65) Prior Publication Data

US 2021/0180773 A1 Jun. 17, 2021

Related U.S. Application Data

(63) Continuation-in-part of application No. 16/714,879, filed on Dec. 16, 2019, now abandoned.

(51) Int. Cl.
*H05B 45/30* (2020.01)
*F21V 14/00* (2018.01)
(Continued)

(52) U.S. Cl.
CPC ......... *F21V 14/025* (2013.01); *F21Y 2105/16* (2016.08); *F21Y 2115/10* (2016.08)

(58) Field of Classification Search
CPC ........ H05B 45/10; H05B 45/30; H05B 47/10; H05B 47/115; F21V 23/0492; F21V 14/00; F21V 14/025
See application file for complete search history.

(56) References Cited

U.S. PATENT DOCUMENTS 6,731,331 B1 5/2004 Watabe et al.
8,269,235 B2 9/2012 Bierhuizen
(Continued)

FOREIGN PATENT DOCUMENTS

EP 2498583 A1 9/2012
EP 2842464 A1 3/2015
(Continued)

OTHER PUBLICATIONS

The extended European Search Report corresponding to EP20160985. 6, dated Jul. 6, 2020, 15 pages.
(Continued)

*Primary Examiner* — Thai Pham

(57) ABSTRACT

A device for controlling illumination of a scene using an LED array that includes a plurality of individually addressable LEDs, built into a hand-held device, is disclosed. The device includes a controller arranged to configure a first sub-set of the LEDs to provide illumination for a target spot in the scene and to monitor movement of the hand-held device. If the controller detects movement of the hand-held device while the first sub-set of the LEDs is providing illumination, then the controller may configure a second sub-set of the LEDs to continue providing illumination of the target spot. In this manner, even though there may have been movement that could change the specific area illuminated by the LED array, the movement is compensated for, at least partially, by selecting one or more other LEDs to illuminate the same target spot in a manner that is substantially unnoticeable to the user.

17 Claims, 6 Drawing Sheets

(51) Int. Cl.
*F21V 14/02* (2006.01)
*F21Y 105/16* (2016.01)
*F21Y 115/10* (2016.01)

(56) References Cited

U.S. PATENT DOCUMENTS

| | | |
|---|---|---|
| 8,654,068 B2 | 2/2014 | Aitken |
| 8,820,963 B2 | 9/2014 | Olsen et al. |
| 8,823,265 B2 * | 9/2014 | Rice .................. B60Q 1/38 315/307 |
| 9,274,342 B2 | 3/2016 | Chien |
| 9,291,806 B2 | 3/2016 | Holman et al. |
| 9,398,229 B2 | 7/2016 | Crane et al. |
| 9,452,705 B2 | 9/2016 | Bouffay et al. |
| 9,470,371 B2 | 10/2016 | Kauffman et al. |
| 9,470,406 B2 | 10/2016 | Catalano |
| 9,855,587 B2 * | 1/2018 | Ito .................. B07C 5/3416 |
| 9,855,887 B1 * | 1/2018 | Potter .................. F21S 41/675 |
| 2009/0021365 A1 * | 1/2009 | Hurwitz .................. B60Q 1/444 340/479 |
| 2011/0260178 A1 | 10/2011 | Bierhuizen |
| 2012/0206050 A1 | 8/2012 | Spero |
| 2013/0107496 A1 | 5/2013 | Bisberg et al. |
| 2016/0147066 A1 | 5/2016 | Ogasawara et al. |
| 2016/0210525 A1 | 7/2016 | Yang et al. |
| 2018/0042692 A1 | 2/2018 | Kim et al. |
| 2018/0187839 A1 | 7/2018 | Vampola |
| 2018/0324929 A1 | 11/2018 | Brock et al. |
| 2019/0132927 A1 | 5/2019 | De Bruijn et al. |
| 2019/0198732 A1 | 6/2019 | Shimizu et al. |
| 2019/0206131 A1 | 7/2019 | Kamal et al. |
| 2019/0264885 A1 * | 8/2019 | Lefaudeux ............ F21S 41/153 |
| 2021/0180754 A1 | 6/2021 | van der Sijde et al. |

FOREIGN PATENT DOCUMENTS

| | | |
|---|---|---|
| EP | 3282179 A1 | 2/2018 |
| JP | 2005-117028 A | 4/2005 |
| WO | 2009/077946 A1 | 6/2009 |
| WO | 2012/023096 A3 | 2/2012 |
| WO | 2013/061203 A1 | 5/2013 |
| WO | 2017/162504 A1 | 9/2017 |

OTHER PUBLICATIONS

Arjen Van Der Sijde et al., U.S. Appl. No. 16/714,879, "LED Arrays With Self-Stabilizing Torch Functions", filed Dec. 16, 2019, 34 pages.

Arjen Van Der Sijde et al., U.S. Appl. No. 17/125,871, "Collimating Torch Using Selective Matrix Illumination", filed Dec. 17, 2020, 35 pages.

* cited by examiner

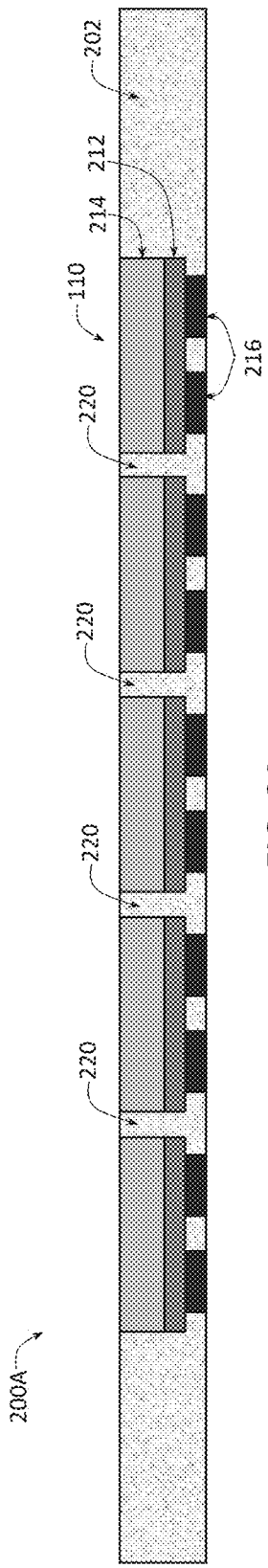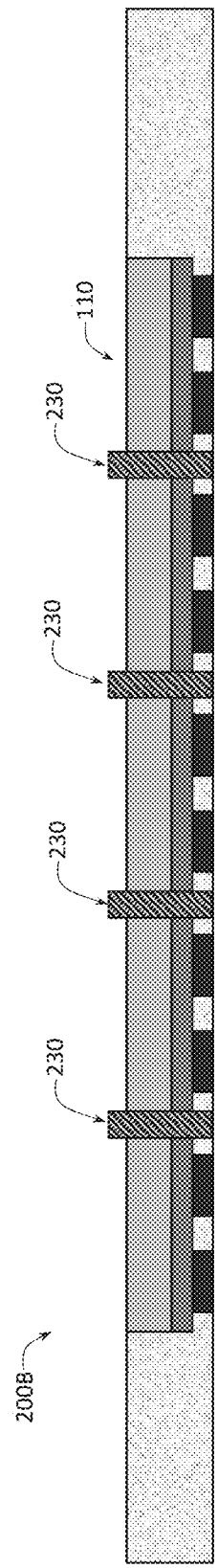

LED ARRAYS WITH SELF-STABILIZING TORCH FUNCTIONS

CROSS-REFERENCE TO RELATED APPLICATIONS

This application is a continuation-in-part of U.S. patent application Ser. No. 16/714,879 filed Dec. 16, 2019, which is incorporated herein by reference in its entirety.

TECHNICAL FIELD OF THE DISCLOSURE

The present disclosure relates generally to light emitting diodes (LEDs) and, more specifically, to controlling illumination provided by arrays of LEDs.

BACKGROUND

LEDs are commonly used as light sources in various applications. LEDs can be more energy-efficient than traditional light sources, providing much higher energy conversion efficiency than incandescent lamps and fluorescent light, for example. Furthermore, LEDs typically radiate less heat into illuminated regions and afford a greater breadth of control over brightness, emission color and spectrum than traditional light sources. These characteristics make LEDs an excellent choice for various lighting applications ranging from indoor illumination to automotive lighting.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2A illustrates a cross-sectional side view of an example LED array with adjacent LEDs separated by trenches, according to some embodiments of the present disclosure;

FIG. 2B illustrates a cross-sectional side view of an example LED array with adjacent LEDs separated by walls, according to some embodiments of the present disclosure;

DESCRIPTION OF EXAMPLE EMBODIMENTS OF THE DISCLOSURE

Overview

Figure 1:
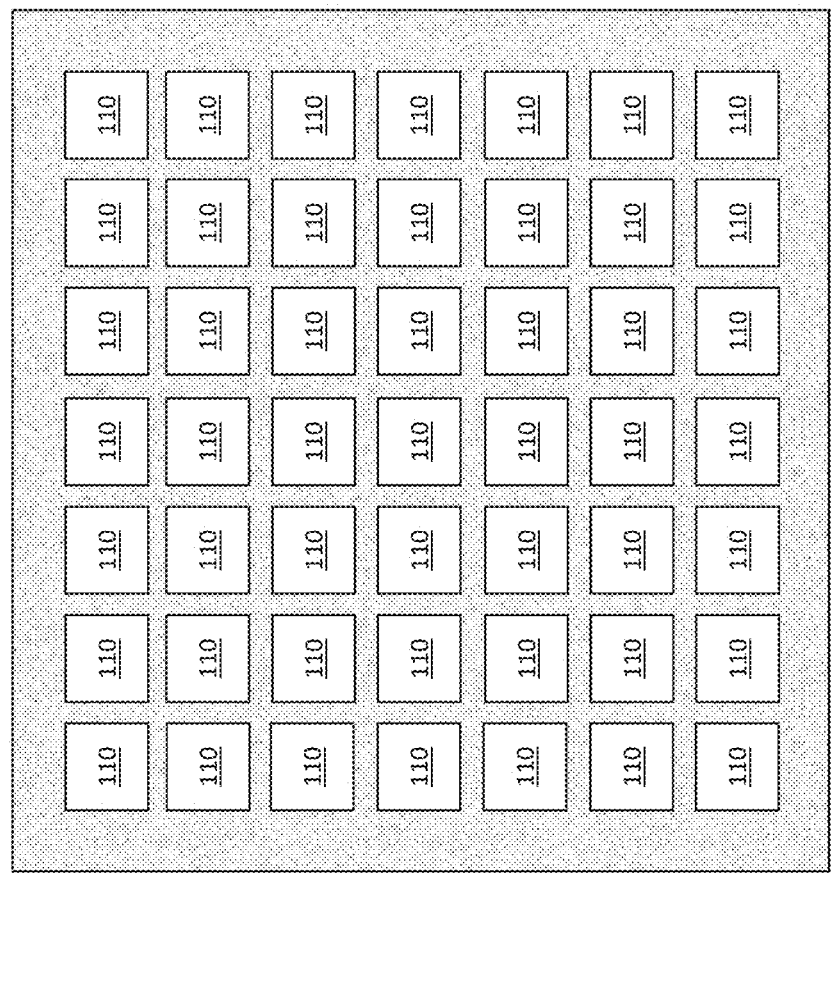
FIG. 1 illustrates a top-down view of an example LED array, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

For purposes of illustrating LED arrays with self-stabilizing torch functions, described herein, it might be useful to understand phenomena that may come into play in context of segmented LED arrays. The following foundational information may be viewed as a basis from which the present disclosure may be properly explained. Such information is offered for purposes of explanation only and, accordingly, should not be construed in any way to limit the broad scope of the present disclosure and its potential applications.

Due to their compact size and low power requirements, LEDs are attractive candidates for light sources for hand-held, battery-powered devices, such as cell phones, tablets, and cameras. In such devices, LED arrays with individually addressable LEDs can achieve superior results in, e.g., strobe and video illumination by illuminating regions in the scene which require light and leaving out those which are sufficiently illuminated. In the past, LED arrays with individually addressable LEDs have been used to focus the illumination only on a specific target spot in a scene, a function commonly referred to as a "torch function."

One challenge with existing LED arrays with torch functions is that the person holding the torch can be distracted, tired, or busy with other things so that the illumination provided by the LED arrays may shift away from the target spot.

Embodiments of the present disclosure provide LED arrays with self-stabilizing torch functions. In one aspect, a device for controlling illumination of a scene using an LED array that includes a plurality of individually addressable LEDs, built into a hand-held device, is disclosed. The device includes a controller arranged to configure a first sub-set of the LEDs to provide illumination for a target spot in the scene and to monitor movement of the hand-held device while the first sub-set of the LEDs is providing illumination. If the controller detects movement of the hand-held device while the first sub-set of the LEDs is providing illumination, then the controller may configure a second sub-set of the LEDs to continue providing illumination of the target spot instead of the first sub-set of the LEDs, where the second sub-set of the LEDs are configured based on (e.g., to compensate for) the detected movement. In this manner, even though there may have been movement that could change the specific area illuminated by the LED array, the movement is compensated for, at least partially, by selecting one or more other LEDs to illuminate the same target spot in a manner that is substantially unnoticeable to the user. Thus, such a device aims to make sure that the target spot remains illuminated independent of the movement of the hand-held device, at least as long as the target spot is still within the field of view of the LED array. LED arrays controlled in this manner are referred to herein as LED arrays "with a self-stabilizing torch function."

It should be noted that, while some descriptions provided herein may refer to hand-held devices, these descriptions are equally applicable to any other devices which are not necessarily hand-held, but which may be affected by movement. For example, in some implementations, LED arrays with self-stabilizing torch functions as described herein may be included in an illumination device mounted on, e.g., a post, where the position and orientation of the illumination device may be affected by, e.g., wind, or any other forces. In another example, in some implementations, LED arrays with self-stabilizing torch functions as described herein may be included in an illumination device on a ship, where the position and orientation of the illumination device may be affected by, e.g., waves.

The plurality of LEDs of an LED array with a self-stabilizing torch function may be provided over a support structure (e.g., a substrate, a chip, or a die). Optionally, the plurality of LEDs of an LED array with a self-stabilizing torch function can be separated from one another, optically and/or electrically, by trenches and/or walls. In some embodiments, the plurality of LEDs may be provided monolithically, e.g., the LEDs may be monolithically grown on a single support structure or may be provided over a monolithic piece of support structure and then separated into individual LEDs, or individual segments, during the fabrication process. In other embodiments, the plurality of LEDs need not be monolithically grown on a single support structure, but may be diced and then arranged on a mount such that the neighboring LEDs are very close together. For example, the LEDs may be provided as an array of a multitude of LEDs that have been fabricated beforehand and then arranged together on the support structure. The plurality of LEDs may be arranged in a plurality of sections where a given section may include one or more LEDs and where each section may be aligned with a different respective optical element such as a lens. In some embodiments, each LED may be a wavelength-converting LED in that it may include a light emitter arrangement (i.e., an arrangement configured to emit light, the arrangement being, e.g., a stack of a p- and an n-type semiconductor layers with an active material in-between) and a wavelength-converter structure (e.g., a material configured to convert the wavelength of the light emitted by the light emitter arrangement, e.g., a layer of a phosphor material) provided over the light emitter arrangement. However, in general, any type of individually addressable LEDs, not limited to wavelength-converting LEDs, may be included in LED arrays with self-stabilizing torch functions as described herein. Other features and advantages of the disclosure will be apparent from the following description and the claims.

In the drawings (e.g., in FIGS. 2A-2B), some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined using, e.g., scanning electron microscopy (SEM) images or transmission electron microscope (TEM) images. In such images of real structures, possible processing defects could also be visible, e.g., not-perfectly straight edges of materials, tapered vias or other openings, inadvertent rounding of corners or variations in thicknesses of different material layers. There may be other defects not listed here but that are common within the field of device fabrication.

As will be appreciated by one skilled in the art, aspects of the present disclosure, in particular aspects of LED arrays with self-stabilizing torch functions, described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing camera devices and/or their controllers, etc.) or be stored upon manufacturing of these devices and systems.

In the following detailed description, various aspects of the illustrative implementations may be described using terms commonly employed by those skilled in the art to convey the substance of their work to others skilled in the art. For example, if used, the term "connected" means a direct electrical or magnetic connection between the things that are connected, without any intermediary devices, while the term "coupled" means either a direct electrical or magnetic connection between the things that are connected, or an indirect connection through one or more passive or active intermediary devices. The term "circuit" may refer to one or more passive and/or active components that are arranged to cooperate with one another to provide a desired function. The terms "substantially," "close," "approximately," "near," and "about," generally refer to being within +/−20%, preferably within +/−10%, of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-15% of a target value based on the context of a particular value as described herein or as known in the art. The terms such as "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature disposed between two features may be in direct contact with the adjacent features or may have one or more intervening layers.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "AB/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, showing, by way of illustration, some of the embodiments that may be practiced. In the drawings, same reference numerals refer to the same or analogous elements/materials so that, unless stated otherwise, explanations of an element/material with a given reference numeral provided in context of one of the drawings are applicable to other drawings where elements/materials with the same reference numerals may be illustrated. The accompanying drawings are not necessarily drawn to scale. Moreover, it will be understood that certain embodiments can include more elements than illustrated in a drawing, certain embodiments can include a subset of the elements illustrated in a drawing, and certain embodiments can incorporate any suitable combination of features from two or more drawings.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

In some examples provided herein, interaction may be described in terms of two, three, four, or more electrical components. However, this has been done for purposes of clarity and example only. It should be appreciated that the devices and systems described herein can be consolidated in any suitable manner. For example, any of the illustrated components, modules, and elements of the accompanying drawings may be combined in various possible configurations, all of which are clearly within the broad scope of the present disclosure. In certain cases, it may be easier to describe a device or a system by only referencing a limited number of elements, but, in general, devices and systems with number of elements other than what is described or shown in the drawings are within the scope of the present disclosure.

The following detailed description presents various descriptions of specific certain embodiments. However, is to be understood that other embodiments may be utilized, and structural or logical changes may be made without departing from the scope of the present disclosure. In general, the innovations described herein can be embodied in a multitude of different ways, for example, as defined and covered by the claims and/or select examples, and the following detailed description is not to be taken in a limiting sense.

Example LED Arrays

FIG. 1 illustrates a top-down view of an example LED array 100, according to some embodiments of the present disclosure. As shown in FIG. 1, the LED array 100 may include a plurality of LEDs 110 arranged in an array or a matrix. Though a 7×7 square array is illustrated in FIG. 1, any suitable number of LEDs may be used, and the array 100 need not be square, it may be rectangular or any suitable shape. The LEDs 110 may be, e.g., white LEDs, or other visible colors as red, green or blue LEDs, ultraviolet (UV) LEDs, infrared (IR) LEDs, or a combination thereof.

In some embodiments, the LEDs 110 may be monolithically grown on a single support structure, e.g., on a single substrate. Alternatively, the LEDs 110 need not be monolithically grown on a single substrate, but may be diced then arranged on a mount such that neighboring LEDs are very close together. In some embodiments, the gap between adjacent ones of the LEDs 110 may be less than ⅓ of a dimension (for example, the width) of an individual LED 110. The size of the individual LEDs 110 may depend on several design parameters as, for example, building volume with optical lens included, field of view of the camera and number of LEDs 110 in the array 100. Though the individual LEDs 110 are shown in FIG. 1 to be square, this is not required; in other embodiments of the LED array 100, rectangular LEDs 110 or LEDs 110 of any suitable shape may be used.

FIG. 2A illustrates a cross-sectional side view of an example LED array 200A with adjacent LEDs 110 separated by trenches, according to some embodiments of the present disclosure, while FIG. 2B illustrates a cross-sectional side view of an example LED array 200B with adjacent LEDs 110 separated by walls, according to some embodiments of the present disclosure. Each of the arrays 200A and 200B may be seen as an example of the LED array 100, but now illustrating only 5 LEDs 110 in a given row (as described above, any number of the LEDs 110 may be included in the LED array 100), where only a single LED 110 is labeled with a reference numeral (while 5 are shown) in order to not clutter the drawings.

As shown in FIG. 2A, an individual LED 110 may include a light emitter arrangement 212, a wavelength-converter structure 214 provided over the light emitter arrangement 212, and interconnects (or contacts) 216.

In some embodiments, the light emitter arrangement 212 may be formed by growing a III-nitride material (i.e., a material including nitrogen and an element from group III of the periodic table, e.g., gallium nitride for blue or UV LEDs) or III-arsenide (i.e., a material including arsenic and an element from group III of the periodic table, e.g., gallium arsenide for IR LEDs) semiconductor structure on a growth substrate (not specifically shown in FIGS. 2A and 2B, although a support structure 202 could be such a grown substrate in some cases) as is known in the art. In some embodiments, the growth substrate may be sapphire but, in other embodiments, it may be any suitable substrate such as, for example, a non-III-nitride material, silicon carbide (SiC), silicon (Si), gallium nitride (GaN), or a composite substrate. A surface of the growth substrate on which the III-nitride or III-arsenide semiconductor structure is grown may be patterned, roughened, or textured before growth, which may improve light extraction from the device. A surface of the growth substrate opposite the growth surface (i.e. the surface through which a majority of light is extracted to be incident onto the wavelength-converter structure 214) may be patterned, roughened or textured before or after growth, which may improve light extraction from the device. In some embodiments, the support structure 202 may include multiple layers of various materials.

Although not specifically shown in FIG. 2A, in some embodiments, the semiconductor structure of the light emitter arrangement 212 may include a light emitting or active region sandwiched between n- and p-type regions. In some embodiments, an n-type region may be grown first and may include multiple layers of different compositions and dopant concentration including, for example, preparation layers such as buffer layers or nucleation layers, which may be n-type or not intentionally doped, and n- or even p-type device layers designed for particular optical, material, or electrical properties desirable for the light emitting region to efficiently emit light. A light emitting or active region may then be grown over the n-type region. Examples of suitable light emitting regions include a single thick or thin light emitting layer, or a multiple quantum well light emitting region including multiple thin or thick light emitting layers separated by barrier layers. A p-type region may then be grown over light emitting region. Similar to the n-type region, the p-type region may include multiple layers of different composition, thickness, and dopant concentration, including layers that are not intentionally doped, or n-type layers.

As described above, LEDs 110 in the array 200A may be formed on a single wafer, then diced from the wafer as an array 200A with individual LEDs 110 in the array still attached to a single growth substrate portion. Alternatively, many LEDs 110 may be formed on a single wafer, then diced from the wafer, such that already-diced, individual LEDs are disposed on a mount to form the array 200A.

A wavelength-converter structure 214 may be disposed in the path of light extracted from the light emitter arrangement 212. In some embodiments, the wavelength-converter structure 214 may include one or more wavelength-converting materials which may be, for example, conventional phosphors, organic phosphors, quantum dots, organic semiconductors, II-VI or III-V semiconductors, II-VI or III-V semiconductor quantum dots or nanocrystals, dyes, polymers, or other materials that luminesce. A wavelength-converting material of the wavelength-converter structure 214 may absorb light emitted by the light emitter arrangement 212 of the LED 110 and emit light of one or more different wavelengths. Unconverted light emitted by the light emitter arrangement 212 may, but does not have to be, part of the final spectrum of light extracted from the LED 110. The final spectrum of light extracted from the LED 110 may be white, polychromatic, or monochromatic. Examples of common combinations include a blue-emitting light emitter arrangement 212 combined with a yellow-emitting wavelength-converter structure 214, a blue-emitting light emitter arrangement 212 combined with green- and red-emitting wavelength-converter structure 214, a UV-emitting light emitter arrangement 212 combined with blue- and yellow-emitting wavelength-converter structures 214, and a UV-emitting light emitter arrangement 212 combined with blue-, green-, and red-emitting wavelength-converter structures 214. Wavelength-converting materials emitting other colors of light may be added to tailor the spectrum of light extracted from the structure. In some embodiments, the wavelength-converter structure 214 may include light scattering or light diffusing elements such as titanium oxide, or may include two or more layers, e.g., one containing the phosphor and the other containing a scattering material such as titanium oxide.

In some embodiments, the wavelength-converter structure 214 may be a structure that is fabricated separately from the light emitter arrangement 212 and attached to the light emitter arrangement 212, for example through wafer bonding or a suitable adhesive such as silicone or epoxy. One example of such a prefabricated wavelength-converting element is a ceramic phosphor, which is formed by, for example, sintering powder phosphor or the precursor materials of phosphor into a ceramic slab, which may then be diced into individual wavelength-converting elements. A ceramic phosphor may also be formed by, for example tape casting, where the ceramic is fabricated to the correct shape, with no dicing or cutting necessary. Examples of suitable non-ceramic pre-formed wavelength-converting elements include powder phosphors that are dispersed in transparent material such as silicone or glass that is rolled, cast, or otherwise formed into a sheet, then singulated into individual wavelength-converting elements, powder phosphors that are disposed in a transparent material such as silicone and laminated over the wafer of LEDs or individual LEDs, and phosphor mixed with silicone and disposed on a transparent substrate. The wavelength-converting element need not be pre-formed, it may be, for example, wavelength-converting material mixed with transparent binder that is laminated, dispensed, deposited, screen-printed, electrophoretically deposited, or otherwise positioned in the path of light emitted by the light emitter arrangements 212 of the LEDs 110.

In some embodiments, the wavelength-converter structure 214 may be disposed in direct contact with the light emitter arrangement 212 in some or all LEDs 110, as illustrated in FIG. 2A. In other embodiments of the LED array 200A, the wavelength-converter structure 214 need not be disposed in direct contact with the light emitter arrangement 212 and may be spaced apart from the light emitter arrangement 212 in one or more of the LEDs 110.

Interconnects 216 such as, for example, solder, stud bumps, gold layers, or any other suitable structure, may be used to electrically and physically connect LEDs 110 in the array 200A to a structure such as a mount, a printed circuit board, or any other suitable structure. The mount may be configured such that individual LEDs 110 may be individually controlled by a driver (e.g., by an LED driver 1416 of FIG. 14). The light emitted by the individual LEDs 110 may illuminate a different part of the scene, e.g., by means of optics, emit in different directions in space. By changing the current to the individual LEDs 110, the light provided to a corresponding part of the scene can be modified.

As also shown in FIG. 2A, adjacent LEDs 110 may be separated by trenches 220. In some embodiments, the trenches 220 may be filled with a material that is substantially non-transparent so that there is substantially no light tunneling between the different LEDs 110. Example materials that may be used to fill the trenches 220 include highly scattering materials achieved by mixing two materials with a large difference in refractive index, such as one or more of titanium dioxide, zirconium oxide or tantalum oxide dispersed in low refractive index silicone. Providing metallic flakes in a matrix may produce a reflective effect, if geometry allows, and may also be used in the trenches 220. In some embodiments, absorbing materials such as carbon dispersed in silicone could also be used to fill the trenches 220 to help provide large contrast between the segments.

FIG. 2B illustrates a similar LED array as that shown in FIG. 2A, except that it further illustrates that, in some embodiments, walls 230 may be provided within the trenches 220. In some embodiments, the walls 230 may be taller than the LED 110 that is enclosed between the adjacent walls 230, as shown in FIG. 2B, thus preventing light emitted by that LED from travelling sideways towards neighboring LEDs. In other embodiments, the walls 230 may be the same height as the LEDs 110. In some embodiments, the walls 230 may be formed of any suitable material (e.g., glass, metal, silicon etc.) with reflective coating, such as a metal (e.g., silver), or dielectric distributed Bragg reflectors (DBRs), for example. In some embodiments, the walls 230 may be formed by a premixed combination of materials, such as a matrix grid formed from silicone mixed with titanium dioxide. In some implementations, the walls 230 may be between 100% and 200% of the height of the LED 110 that is enclosed in it. The walls 230 may be formed using any suitable type of process, such as plasma enhanced chemical vapor deposition, atomic layer deposition, evaporation deposition, sputtering deposition, photolithography or silicone molding (using, e.g., silicone with titanium dioxide). All other descriptions provided with respect to the LED array 200A are applicable to the LED array 200B and, therefore, in the interests of brevity are not repeated.

Example Devices and Methods for Providing a Self-Stabilizing Torch Function

Figure 3A:
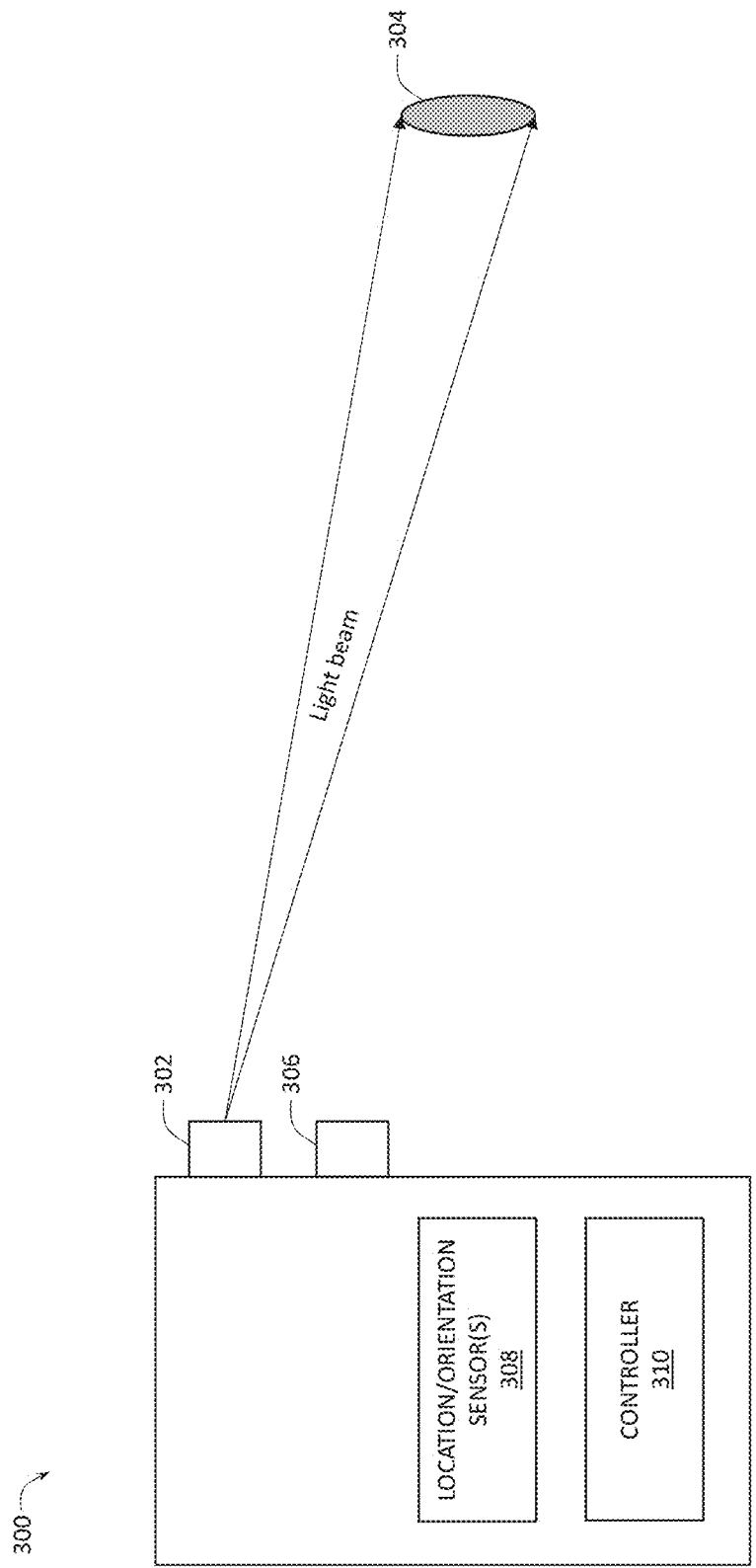
FIG. 3A provides an illustration of using an example hand-held device with an LED array with a self-stabilizing torch function to illuminate a scene, according to some embodiments of the present disclosure.

LED arrays as described herein, e.g., the LED arrays 100, 200A, or 200B may be included in a moveable, e.g., a hand-held, device and may be provided with a self-stabilizing torch function to help make sure that a given target spot remains illuminated independent of the movement of the hand-held device. FIG. 3A provides an illustration of using an example moveable device 300 with an LED array with a self-stabilizing torch function to illuminate a scene, according to some embodiments of the present disclosure. In some embodiments, the device 300 may be a cell/mobile phone, a tablet, a camera, or any other device that may be subject to being moved (i.e., moveable) and may include an LED array with a self-stabilizing torch function as described herein. In some embodiments, the device 300 may be included in an adaptive lighting system, i.e., in a system where the beam pattern projected is selectively altered. For example, in an adaptive lighting system for an automotive headlight, the beam pattern projected anticipates the direction of the automobile and selectively alters the beam pattern to produce light in that direction. In such embodiments, the light emitter 302 of the device 300 may be used as a light source for an adaptive lighting system such as an automotive headlamp.

As shown in FIG. 3A, the device 300 may include a light emitter 302 configured to generate a light beam to illuminate a target object 304 in a scene. To that end, the light emitter 302 may include any of the LED arrays 100, 200A, or 200B, described herein. In the embodiments where the device 300 is a camera device, e.g., a cell phone equipped with a camera, the device 300 may also include a camera 306, comprising one or more image sensors, configured to acquire one or more images of the target object 304 illuminated by the light emitter 302. In some embodiments, the light emitter 302 may be a camera flash, configured to provide illumination as the camera 306 is acquiring one or more images. In some embodiments, the camera 306 may be a video camera and the one or more images may include a plurality of frames of a video acquired by the camera 306. As further shown in FIG. 3A, the device 300 may further include one or more location/orientation sensors 308 (e.g., movement or motion detection sensors) and a controller 310. The use of these components in realizing a self-stabilizing torch function will be explained with reference to FIG. 4, providing a flow diagram of a method 400 for illuminating a scene using an LED array with a self-stabilizing torch function, according to some embodiments of the present disclosure.

Figure 3B:
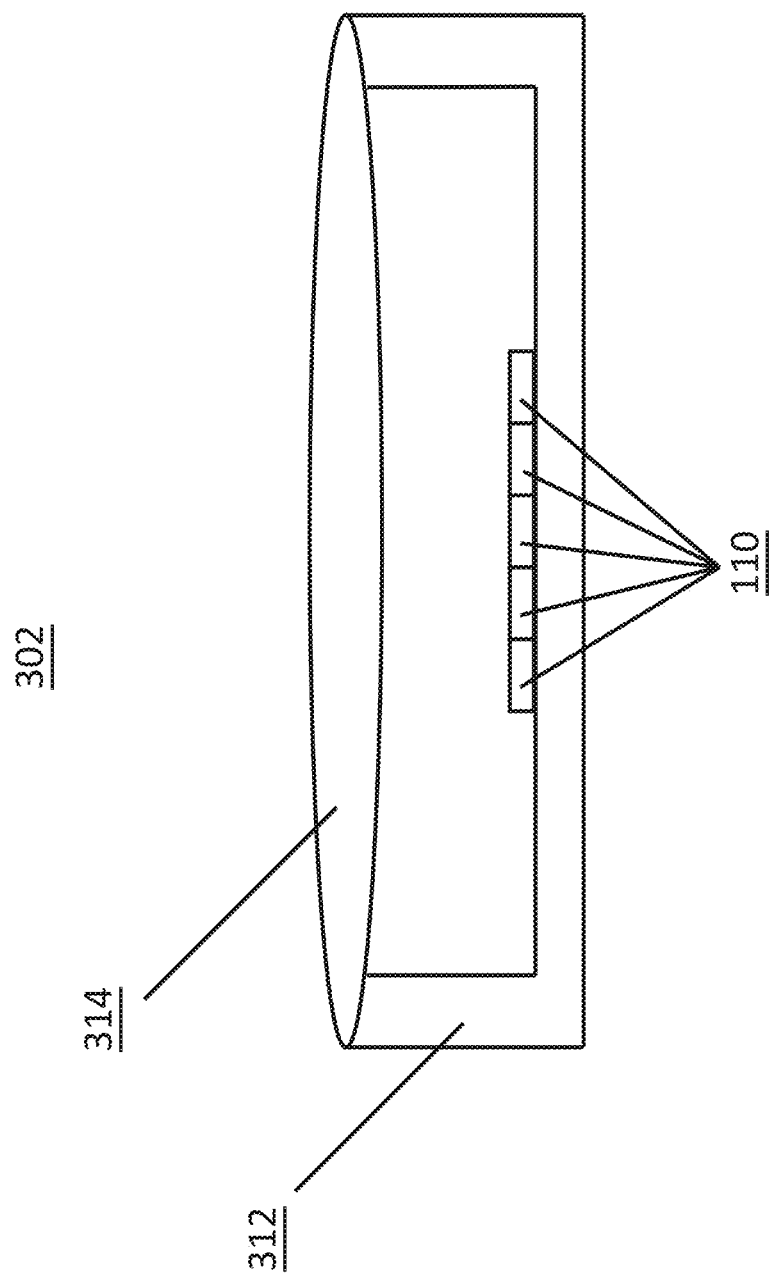
FIG. 3B provides a more detailed illustration of an example of the light emitter device in the hand-held device of FIG. 3A.

FIG. 3B provides a cross-sectional view of an example light emitter 302 that may be used in the hand-held device 300 of FIG. 3A. In the example of FIG. 3B, light emitter 302 comprises a housing 312 in which is arranged an array of LEDs 110 that are independently operable, or groups of which are independently operable. Light emitter 302 also comprises a lens, lens system, or similar optical element 314 that collects light emitted by the array of LEDs and directs the collected light to provide an optical output beam from the light emitter. Optical element 314 may be positioned to image the LEDs in the array into the optical far field, for example.

The light beam emitted by light emitter 302 may be steered by operation of subsets of the LEDs. For example, if only a first group of one or more LEDs at the right-hand side of the array as shown in the figure is operated, light emitter 302 will produce an output beam that exits optical element 302 directed toward the upper left-hand side of the figure. If instead only a second group of one or more LEDs in the central portion of the array near or aligned with the optical axis of the optical element is operated, light emitter 302 will produce an output beam that exits optical element generally along its optical axis, i.e., straight up in the figure. If instead only a third group of one or more LEDs at the left-hand side of the array as shown in the figure is operated, light emitter 302 will produce an output beam that exits optical element 302 directed toward the upper right-hand side of the figure. Thus sequential operation of the first group, the second group, and then the third group of LEDs will steer the optical beam from the left to the right in the figure. The output beam may be similarly steered along more complicated paths by operation of subsets of the LEDs.

As further discussed below, such steering of the output beam may be used to compensate for motions of the light emitter (e.g., motions of a device of which the light emitter is a component) to maintain the aim of the beam on a desired target despite those motions.

The collimation of the light beam emitted by light emitter 302 may also be controlled by operation of subsets of the LEDs. For example, if in the above example the second group of LEDs includes a plurality of LEDs near or aligned with the optical axis of the optical element, the output beam will have a first collimation. If peripheral ones of that group of LEDs are turned off, with only the most central LEDs of the group operated, the collimation of the output beam will increase. That is, the cone angle of the output beam will decrease as will the beam diameter in the far field. This occurs because in the illustrated arrangement the collimation improves as light source area (number of LEDs in operation) decreases. Collimation may be varied in a similar manner for beams directed in other directions, away from the optical axis of the optical element. Collimation may be varied during steering of the beam.

The total optical output power in the beam may be maintained at a constant level while collimation is varied, by driving the group of operated LEDs with the same amount of electrical power regardless of the number of LEDs in the group. For example, if only a group of four LEDs is initially operated to provide an output beam and then two are turned off to improve collimation of the beam, the remaining two LEDs in operation may be operated at twice the power at which they were operated when all four LEDs in the group were operated. This will provide a more collimated beam with the same total optical power. The more collimated beam will appear brighter to an observer.

Referring again to FIG. 4, the method 400 may begin with step 402 that includes the controller 310 configuring a first sub-set of the LEDs of the LED array of the light emitter 302 to provide illumination for the target spot 304 in a scene. In some embodiments, configuring the LEDs in step 402 (or in step 406, described below), may include the controller 310 configuring the LEDs to provide illumination that includes visual information for a user, e.g., displaying arrows or other signs indicative of geographical directions, displaying warning signs, etc.

In some embodiments, configuring the first sub-set of the LEDs includes selecting one or more LEDs of the LED array to be included in the first sub-set based on one or more of a location and an orientation of the moveable device 300, in particular, based on one or more of a location and an orientation of the light emitter 302. To that end, the location and/or orientation may be provided to controller 310 in various manners. In some embodiments, the original location and/or orientation may be pre-set, e.g., programmed in the controller 310. In other embodiments, the controller 310 may make use of the one or more location/orientation sensors 308, e.g., as described with reference to step 404 below, to determine location and/or orientation to configure the first sub-set of LEDs in step 402. In some embodiments, configuring the LEDs to provide illumination for the target spot 304 may include the controller 310 setting drive signals for driving each LED of the first sub-set of the LEDs of the light emitter 302 to provide illumination. Thus, the controller 310 may ensure that the LEDs of the array are individually configured to provide desired intensity of illumination to ensure that the target spot 304 is illuminated.

Once the first sub-set of LEDs have been configured to, and start, providing illumination of the target spot 304, in step 404, the controller 310 may be configured to detect whether there might be any movement of the LED array of the light emitter 302 that might affect the illumination spot, and, if any such movement is detected, then, in step 406, re-configure the LEDs of the LED array to compensate for the movement and continue illuminating the target spot 304. For example, in some embodiments, detecting movement in step 404 may include the controller 310 detecting that one or more of the location and the orientation of the LED array of the light emitter 302, or of the moveable device 300, has changed, e.g., has changed beyond a certain threshold to constitute a significant enough movement that requires compensation in the illumination provided by the LEDs of the array. Re-configuring the LEDs in step 406 may include configuring a second sub-set of the LEDs of the LED array of the light emitter 302 to continue providing illumination of the target spot 304, instead of the first sub-set of the LEDs configured in step 402, where the second sub-set of the LEDs are configured based on (e.g., to compensate for) the movement detected in step 404. Similar to configuring the first sub-set of LEDs, the controller 310 re-configuring the LEDs in step 404 may include setting drive signals for driving each LED of the second sub-set of the LEDs to provide illumination. In some embodiments, configuring the second sub-set of the LEDs in step 406 may include the controller 310 selecting one or more LEDs of the LED array of the light emitter 302 to be included in the second sub-set based on one or more of the location and the orientation of the LED array after the movement detected in step 404, where the second sub-set of LEDs may be different from the first sub-set in at least one LED that has been selected (in various embodiments, each of the first and the second sub-sets of the LEDs may include less than all of the LEDs of the LED array of the light emitter 302). In other embodiments, the LEDs of the second sub-set configured in step 406 may include the same LEDs as those selected for the first sub-set but the intensity of light generated by at least some of those LEDs may be different. The re-configuring of the LEDs in step 406 may be performed to try to make sure that the illumination provided by the second sub-set of the LEDs configured in step 406 replaces, and is continuous with, the illumination provided by the first sub-set of the LEDs configured in step 402, and remains on the target spot 304 despite the movement. In this manner, even though there may have been movement that would change the area illuminated by the LED array, the controller 310 may at least partially compensate for the movement in step 406 by selecting other LEDs, or by providing different drive signals to the same LEDs as were selected in step 402, e.g., to illuminate the same target spot 304 in a manner that is substantially unnoticeable to the user or to reduce or minimize the change in the target spot 304 being illuminated.

In some embodiments, the controller 310 may be configured to detect movement in step 410 based on one or more signals received from one or more sensors included in the moveable device, e.g., based on signals received from the location/orientation sensors 308 and/or based on signals received from the image sensors of the camera 306. For example, the location/orientation sensors 308 may include one or more inertial sensors which may generate signals indicative of one or more of the movement, location, and orientation of the LED array of the light emitter 302. For example, the signals generated by such sensors may be indicative of location and/or orientation of the LED array along each of 3 axes. In some embodiments, the location/orientation sensors 308 may include one or more of an accelerometer, a magnetometer, a gyroscope, a time-of-flight sensor, a displacement sensor (e.g., based on laser or radar), a speedometer, and an internet-of-things device (e.g., configured to detect position and/or movement). Such sensors 308 may be communicatively connected to the controller 310 to provide the controller 310 with signals based on which the controller 310 may detect movement of the LED array of the light emitter 302 in step 404. For example, while angular movement can be directly translated into a compensation method on the LED array and optics, for the controller 310 to compensate for the displacement of the mobile device, the controller may also use information indicative of the distance to the target illuminated to predict the necessary compensation method on the LED array and optics.

In some embodiments, the controller 310 may be configured to detect movement in step 410 based on one or more images acquired by the camera 306. Thus, the image sensors of the camera 306 may act as motion/movement sensors in such embodiments. For example, the controller 310 may be configured to detect movement based on comparison of a plurality of images of the scene acquired by the camera 306. It should be noted that the controller 310 does not necessarily need to "calculate" a movement in order to compensate for it in torch illumination in step 406. For example, in some embodiments, the controller 310 may be configured with a direct feedback loop that may, e.g., analyze the images acquired by the camera 306, and try to make sure that the illumination spot and the target object 304 overlap. If the controller 310 determines that the overlap is, e.g., reduced on one side of the object, then the second sub-set of the LEDs (e.g., the LEDs on the other side) will be powered up in step 406, etc. In other embodiments, by analyzing the images acquired by the camera 306 the controller 310 may be configured to differentiate between the movement of the camera 306 (which would be indicative of the movement of the LED array of the light emitter 302), e.g., with respect to some non-moving objects in the images, and the movement of the target spot 304, and use this information to re-configure the LED in step 406. There are many other examples of how the controller 310 may analyze images acquired by the camera 306 to extract information indicative of the movement of the LED array of the light emitter 302 to compensate for the movement in the illumination provided by the array, all of which being within the scope of the present disclosure.

Figure 4:
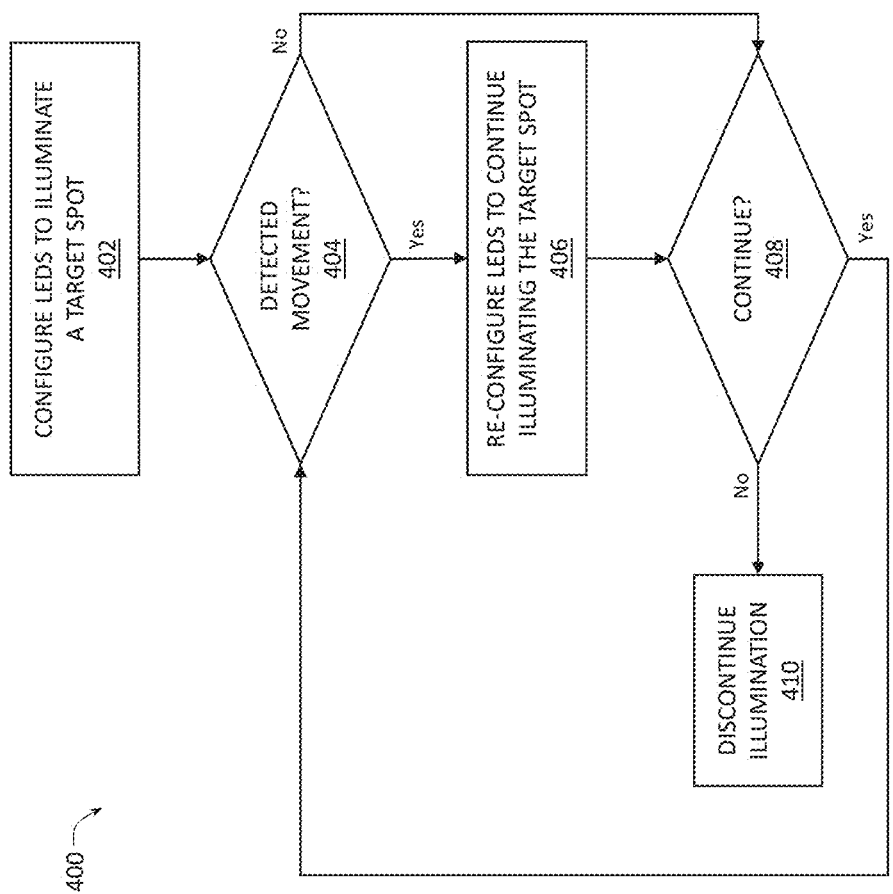
FIG. 4 provides a flow diagram of a method for illuminating a scene using an LED array with a self-stabilizing torch function, according to some embodiments of the present disclosure.

As also shown in FIG. 4, the method 400 may also, optionally, include step 408 where the controller 310 may determine whether to continue providing illumination of the target spot 304, e.g., based on user input. If so, then the method 400 may proceed back to step 404 where the controller 310 continues to monitor movements. Otherwise, the method 400 may end with discontinuing illumination of the target spot 304, in step 410.

Figure 5:
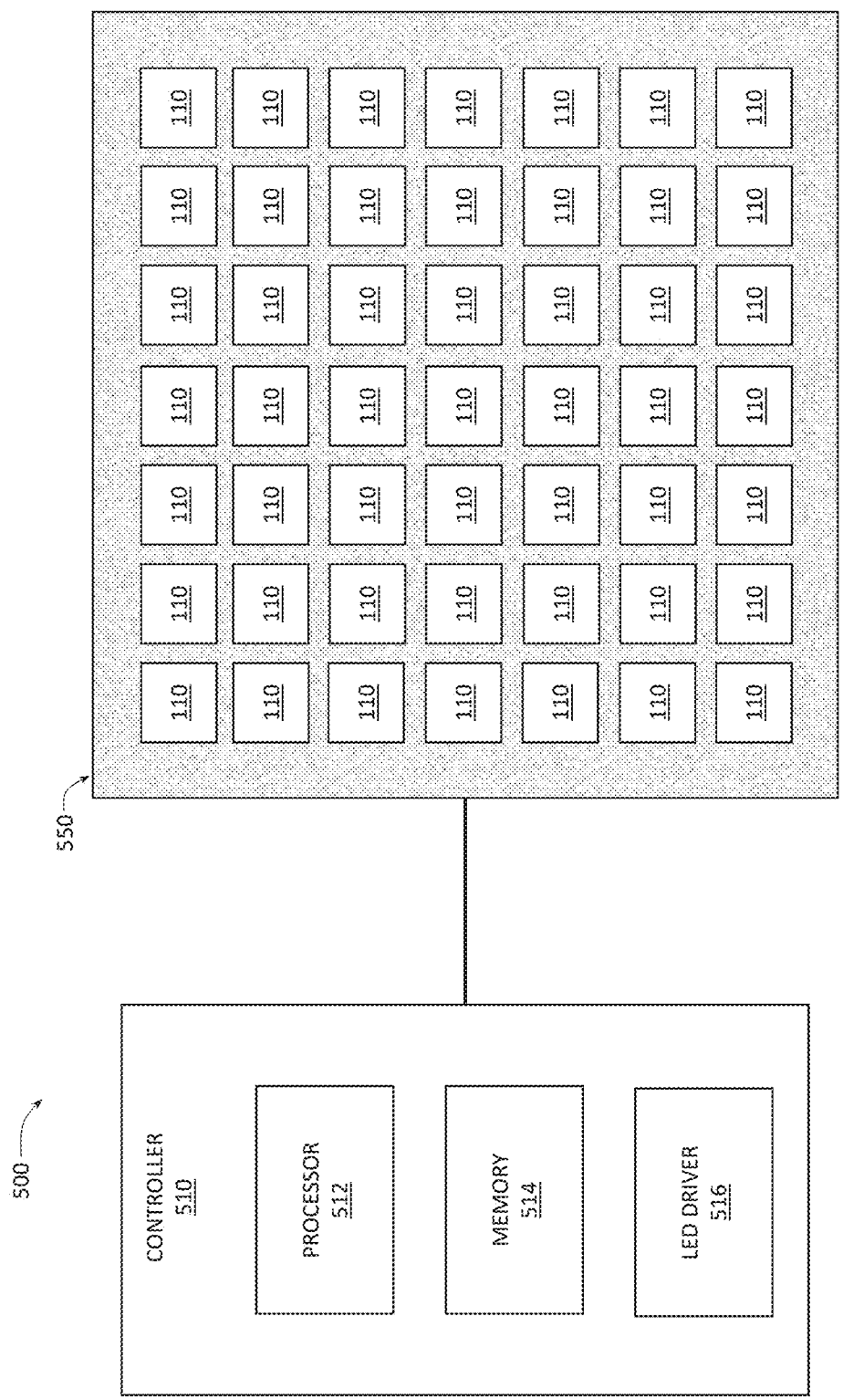
FIG. 5 provides a block diagram illustrating an example system with a light emitter and a controller, according to some embodiments of the present disclosure.

Controllers that provide one or more LED arrays with a self-stabilizing torch function as described herein may be implemented as shown in FIG. 5 and may be included in any suitable system, e.g., in an adaptive lighting system. FIG. 5 provides a block diagram illustrating an example system 500 with a light emitter 550 and a controller 510, according to some embodiments of the present disclosure.

As shown in FIG. 5, the light emitter 550 may include an LED array of a plurality of the LEDs 110 as described with reference to FIGS. 1, 2A, and 2B. For example, the light emitter 550 may be the light emitter 302, shown in FIG. 3. As further shown in FIG. 5, the controller 510 may include a processor 512, a memory 514, and an LED driver 516. The controller 510 may be the controller 310, shown in FIG. 3. For example, the controller 510 may be set to configure a first sub-set of the LEDs to provide illumination of a target spot in a scene based on one or more of the location and the orientation of the LED array at a first time (the location and/or orientation determined, e.g., based on the signals generated by the one or more sensors at the first time). The controller 510 may further be configured to, while the first sub-set of the LEDs provides illumination, monitor the signals generated by the one or more sensors to determine whether one or more of the location and the orientation has changed from the one or more of the location and the orientation at the first time. Upon positive determination (i.e., when the controller determined that the one or more of the location and the orientation has changed from the one or more of the location and the orientation at the first time), the controller 510 may be set to configure a second sub-set of the LEDs to provide illumination of the target spot based on one or more of the location and the orientation of the LED array at a second time, determined based on the signals generated by the one or more sensors at the second time.

The processor 512, e.g. a hardware processor 512, can execute software or an algorithm to perform the activities as discussed in this specification, in particular activities related to controlling the LEDs 110 of the light emitter 550 to implement self-stabilization so that the torch illumination provided by the LEDs 110 can remain on the target spot 304 despite the movement of the light emitter 550. To that end, the processor 512 may include any combination of hardware, software, or firmware providing programmable logic, including by way of non-limiting example a microprocessor, a digital signal processor (DSP), an application-specific integrated circuit (ASIC) processor, a field-programmable gate array (FPGA), a general-purpose processor (e.g., an ARM-based processor, an x86-based processor, a MIPS processor, etc.), or a virtual machine processor. In some embodiments, the processor 512 may be communicatively coupled to the memory 514, for example in a direct-memory access (DMA) configuration, so that the processor 512 may read from or write to the memory 514. In some embodiments, the processor 512 may be coupled to the memory 514 through a system bus (not shown in FIG. 5). The processor 512 may be configured to execute program code stored in the memory 514, e.g., by accessing the program code from the memory 514 via a system bus.

The memory 514 may include any suitable type of volatile and non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. The information being measured, processed, tracked or sent to or from any of the components of the system 500 could be provided in any database, register, control list, cache, or storage structure, all of which can be referenced at any suitable timeframe. Any such storage options may be included within the broad term "memory" as used herein The driver 516 may include any suitable type of electronic circuit configured to bias and/or supply current to any of the LEDs in the light emitter 550.

In some implementations, the controller 510 may configure some of the LEDs in the light emitter 550 to operate as emitters by applying a forward bias to those LEDs. In some implementations, the controller 510 may be configured to address each of the LEDs in the light emitter 550 individually. For example, the controller 510 may be configured to change the magnitude of the bias of any LED in the light emitter 550 independently from the rest. As another example, the controller 510 may be configured to increase or decrease the current supplied to any LED in the light emitter 550 without changing the supply of current to any of the other LEDs in the light emitter 550. Although in the present example the controller 510 is used to control an LED matrix shown to have a single LED chip, alternative implementations are possible in which the controller 510 is configured to control any suitable type of LED matrix, including a matrix that might include multiple LED chips.

Although not specifically shown in FIG. 5, in some embodiments, input/output (I/O) devices can, optionally, be coupled to the controller 510. Examples of input devices may include, but are not limited to, a keyboard, a pointing device such as a mouse, or the like. Examples of output devices may include, but are not limited to, a monitor or a display, speakers, or the like. In some embodiments, an output device coupled to the controller 510 may be any type of screen display, such as plasma display, liquid crystal display (LCD), organic light emitting diode (OLED) display, electroluminescent (EL) display, or any other indicator, such as a dial, barometer, or LED. In some implementations, the system 500 may include a driver (not shown) for the output device. Input and/or output devices may be coupled to the controller 510 either directly or through intervening I/O controllers. In an embodiment, the input and the output devices may be implemented as a combined input/output device, such as a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

Although also not specifically shown in FIG. 5, in some embodiments, a camera (e.g., the camera 306, shown in FIG. 3) and, optionally, an image processing device, could be coupled to the controller 510, configured to provide input to the controller 510. For example, the light emitter 550 may act as a camera flash while the camera is acquiring an image (which could be one of the frames of a video that the camera may be recording), then the controller 510 may analyze the acquired images and adjust the illumination of the scene by adjusting the drive signals provided to the individual LEDS of the light emitter 550.

Although also not shown in FIG. 5, in some embodiments, a network adapter may also, optionally, be coupled to the controller 510 to enable it to become coupled to other systems, computer systems, remote network devices, and/or remote storage devices through intervening private or public networks. The network adapter may comprise a data receiver for receiving data that is transmitted by said systems, devices and/or networks to the controller 510, and a data transmitter for transmitting data from the controller 510 to said systems, devices and/or networks. Modems, cable modems, and Ethernet cards are examples of different types of network adapter that may be used with the system 500.

SELECT EXAMPLES

Example 1 provides a device for controlling illumination of a scene by an LED array that includes a plurality of individually addressable LEDs and is built into a moveable device. The device includes a controller, arranged to configure a first sub-set of the LEDs to provide illumination for a target spot in the scene, detect movement of the LED array while the first sub-set of the LEDs is providing illumination, and configure a second sub-set of the LEDs to continue providing illumination of the target spot instead of the first sub-set of the LEDs, where the second sub-set of the LEDs are configured based on (e.g., to compensate for) the detected movement.

Example 2 provides the device according to example 1, where configuring the first sub-set of the LEDs includes selecting one or more LEDs of the LED array to be included in the first sub-set based on one or more of a location and an orientation of the LED array.

Example 3 provides the device according to example 2, where configuring the first sub-set of the LEDs further includes setting drive signals for driving each LED of the first sub-set of the LEDs to provide illumination. Thus, the controller may ensure that the LEDs of the array are individually configured to provide desired intensity of illumination to ensure that the target spot is illuminated.

Example 4 provides the device according to examples 2 or 3, where detecting movement includes detecting that one or more of the location and the orientation of the LED array has changed, e.g., has changed beyond a certain threshold to constitute a significant enough movement that requires compensation in the illumination provided by the LEDs of the array.

Example 5 provides the device according to any one of examples 2-4, where configuring the second sub-set of the LEDs includes selecting one or more LEDs of the LED array to be included in the second sub-set based on one or more of the location and the orientation of the LED array after the detected movement, where the second sub-set is different from the first sub-set in at least one LED that has been selected.

Example 6 provides the device according to example 5, where configuring the second sub-set of the LEDs further includes setting drive signals for driving each LED of the second sub-set of the LEDs to provide illumination.

Example 7 provides the device according to any one of the preceding examples, where the controller is configured to detect movement based on one or more signals received from one or more sensors included in the moveable device.

Example 8 provides the device according to example 7, where the one or more sensors include one or more inertial sensors.

Example 9 provides the device according to examples 7 or 8, where the one or more sensors include one or more of an accelerometer, a magnetometer, a gyroscope, a time-of-flight sensor, a stereo camera, structured light three-dimensional system, a displacement sensor (e.g., based on laser or radar), a speedometer, and an internet-of-things device (e.g., configured to detect position and/or movement).

Example 10 provides the device according to any one of the preceding examples, where the controller is configured to detect movement based on comparison of a plurality of images of the scene acquired by a camera. Thus, in such embodiments, the camera may act as a "motion/movement sensor."

Example 11 provides a moveable device that includes an LED array, one or more sensors, and a controller. The LED array includes a plurality of individually addressable LEDs. The one or more sensors are configured to generate signals indicative of one or more of a location (position) and an orientation of the LED array. The controller is configured to configure a first sub-set of the LEDs to provide illumination of a target spot in a scene based on one or more of the location and the orientation of the LED array at a first time, determined based on the signals generated by the one or more sensors at the first time. The controller is further configured to, while the first sub-set of the LEDs provides illumination, monitor the signals generated by the one or more sensors to determine whether one or more of the location and the orientation has changed from the one or more of the location and the orientation at the first time, and, upon positive determination (i.e., when the controller determined that the one or more of the location and the orientation has changed from the one or more of the location and the orientation at the first time), configure a second sub-set of the LEDs to provide illumination of the target spot based on one or more of the location and the orientation of the LED array at a second time, determined based on the signals generated by the one or more sensors at the second time.

Example 12 provides the moveable device according to example 11, where the illumination provided by the second sub-set of the LEDs replaces, and is continuous with, the illumination provided by the first sub-set of the LEDs.

Example 13 provides the moveable device according to examples 11 or 12, where the one or more sensors include one or more inertial sensors, and where the signals generated by the one or more inertial sensors are signals indicative of one or more of the orientation and the location of the LED array along each of 3 axes.

Example 14 provides the moveable device according to examples 11 or 12, where the one or more sensors include one or more image sensors, and where the signals generated by the one or more image sensors include image data for a plurality of images of the scene acquired by the one or more image sensors, the plurality of images indicative of one or more of the location and the orientation of the LED array.

Example 15 provides the moveable device according to any one of examples 11-14, where configuring the first sub-set or the second sub-set of the LEDs to provide illumination includes configuring the first sub-set or the second sub-set of the LEDs to provide illumination that includes visual information for a user, e.g., displaying arrows or other signs indicative of geographical directions, displaying warning signs, etc.

Example 16 provides the moveable device according to any one of examples 11-15, where at least one of the first sub-set and the second sub-set of the LEDs includes less than all of the plurality of the LEDs of the LED array.

Example 17 provides the moveable device according to any one of examples 11-16, where each of the LEDs of the LED array is individually addressable.

Example 18 provides a non-transitory computer-readable storage medium or a computer program product, storing computer-readable instructions operable to, when the instructions are executed on a processor, to configure a first sub-set of light-emitting diodes (LEDs) of a mobile device to provide illumination of a target spot in a scene, the first sub-set of the LEDs configured based on a position of the mobile device with respect to the target spot; while the first sub-set of the LEDs are providing illumination, determine that the position of the mobile device with respect to the target spot has changed to a new position; and configure a second sub-set of the LEDs to provide illumination of the target spot in the scene, the second sub-set of the LEDs configured based on the new position of the mobile device with respect to the target spot.

Example 19 provides the non-transitory computer-readable storage medium or the computer program product according to example 18, where the position of the mobile device includes one or more of a location and an orientation of the mobile device with respect to the target spot.

Example 20 provides the non-transitory computer-readable storage medium or the computer program product according to examples 18 or 19, where the second sub-set of the LEDs are configured to provide illumination to replace illumination provided by the first sub-set of the LEDs.

Example 21 provides an electronic device that includes a light emitter that includes a plurality of LEDs, and further includes a controller configured to generate drive signals to selectively drive one or more of the plurality of LEDs, where the controller is a controller according to any one of the preceding examples.

Example 22 provides the electronic device according to example 21, where the controller includes a processor and a memory.

Example 23 provides the electronic device according to examples 21 or 22, where the electronic device is a camera device that includes a camera, and where the light emitter is a flash for the camera.

Example 24 provides the electronic device according to any one of examples 21-23, where the electronic device is a wearable electronic device (e.g., a smart watch) or a hand-held electronic device (e.g., a mobile phone).

Example 25 provides the electronic device according to any one of examples 21-23, where the electronic device is an automotive headlamp/headlight, or any lamp/light used in a vehicle.

Example 26 provides the electronic device according to any one of examples 21-23, where the electronic device is a light source of an adaptive lighting system.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It should be appreciated that the electrical circuits of the accompanying drawings and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

In some embodiments, any number of electrical circuits of the accompanying drawings may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In some embodiments, the electrical circuits of, or associated with, the accompanying drawings may be implemented as stand-alone modules (e.g., a device with associated components and circuitry configured to perform a specific application or function) or implemented as plug-in modules into application specific hardware of electronic devices. Note that some embodiments of the present disclosure may be readily included in a system on chip (SOC) package, either in part, or in whole. An SOC represents an integrated circuit (IC) that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, at least some aspects of controlling LED arrays with self-stabilizing torch functions may be implemented in one or more silicon cores in Application Specific Integrated Circuits (ASICs), Field Programmable Gate Arrays (FPGAs), and other semiconductor chips.

It is also important to note that the functions related to LED arrays with self-stabilizing torch functions, e.g., those summarized in the one or more processes shown in FIG. 4, illustrate only some of the possible functions that may be executed by, or within, the hand-held devices as described herein. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the devices and systems described herein may also be implemented with respect to the methods or processes described herein and specifics in the examples may be used anywhere in one or more embodiments.

The invention claimed is:

1. A light emitting device comprising:
an array of light emitting diodes (LEDs), wherein individual LEDs of the array, or groups of the LEDs of the array, are operable independently of one another;
an optical element arranged to collect light emitted by the LEDs and form an output beam from the light emitting device;
a motion detector configured to detect motion of the light emitting device; and
a controller configured to receive input from the motion detector and to operate the LEDs according to a spatiotemporal sequence including at least three adjacent LEDs or groups of LEDs that, when imaged by the optical element, results in a corresponding spatiotemporal sequence of output beam directions with respect to the light emitting device that compensates for motion of the light emitting device with respect to an external environment and maintains a predetermined direction for the output beam with respect to the external environment.

2. The light emitting device of claim 1, wherein the array of LEDs is monolithic.

3. The light emitting device of claim 1, wherein the LEDs are configured to output white light.

4. The light emitting device of claim 1, wherein the individual LEDs are independently operable.

5. The light emitting device of claim 1, wherein the groups of the LEDs are independently operable.

6. The light emitting device of claim 1, wherein the optical element is or comprises a lens.

7. The light emitting device of claim 1, wherein the controller is configured to control operation of the LEDs to alter collimation of the output beam by changing the number of LEDs operated to form the output beam.

8. The light emitting device of claim 7, wherein the controller is configured to change collimation of the output beam while steering the output beam.

9. The light emitting device of claim 1, wherein the motion detector comprises an image sensor.

10. The light emitting device of claim 1, wherein the motion detector comprises an inertial sensor.

11. The light emitting device of claim 1, comprising a location detector.

12. The light emitting device of claim 1, wherein:
the array of LEDs is monolithic; and
the LEDs are configured to output white light.

13. A method of operating a light emitting device comprising an array of independently operable light emitting diodes (LEDs) or groups of LEDs configured to provide an output beam from the light emitting device, the method comprising:
aiming the output beam from the light emitting device at a target;
using a motion detector, detecting a change in position, orientation, or position and orientation of the light emitting device after aiming the output beam at the target; and
using a controller configured to receive input from the motion detector and control operation of the LEDs, operating the LEDs according to a spatiotemporal sequence including at least three adjacent LEDs or groups of LEDs that, when imaged by the optical element, results in a corresponding spatiotemporal sequence of output beam directions with respect to the light emitting device that compensates for the change in position, orientation, or position and orientation of the light emitting device and maintains aim of the output beam on the target.

14. The method of claim 13, comprising forming the output beam with an optical element that collects light emitted by the LEDs.

15. The method of claim 13, comprising altering the collimation of the output beam by changing the number of LEDs operated to form the output beam.

16. The method of claim 15, comprising altering the collimation of the output beam while compensating for the change in position, orientation, or position and orientation of the light emitting device.

17. The method of claim 13, comprising detecting the change in position, orientation, or position and orientation of the output beam from one or more images that include the target.

* * * * *